United States Patent [19]

Fortunato

[11] 4,187,679
[45] Feb. 12, 1980

[54] DEVICE FOR INVERTING THE DIRECTION OF ROTATION OF A DRIVEN SHAFT

[75] Inventor: Enrico Fortunato, Milan, Italy

[73] Assignee: Franco Tosi S.p.A., Milan, Italy

[21] Appl. No.: 881,715

[22] Filed: Feb. 27, 1978

[51] Int. Cl.² ............................................. F16D 33/04
[52] U.S. Cl. ...................................... 60/331; 60/334; 60/352
[58] Field of Search ................. 60/330, 331, 332, 334, 60/342, 352, 354, 359, 435, 437; 74/664, 720, DIG. 8; 192/3.22, 3.28, 3.3, 3.31

[56] References Cited

U.S. PATENT DOCUMENTS

| | | | |
|---|---|---|---|
| 1,199,364 | 9/1916 | Fottinger | 60/334 |
| 2,474,586 | 6/1949 | Lysholm | 60/334 |

FOREIGN PATENT DOCUMENTS 228559  6/1960  Australia .................................. 192/3.28

*Primary Examiner*—Edgar W. Geoghegan
*Attorney, Agent, or Firm*—Holman & Stern

[57] ABSTRACT

In an oil-coupling arrangement for transferring the drive from a driving shaft to a driven shaft, particularly for the propulsion of ships, the improvement is disclosed wherein the oil cup system has switchable vanes which can be switched from one position to another, and vice versa, so as to deflect the oil stream in the driving and the driven cup in such a way that the driven cup is compelled to rotate in a direction contrary to that of the driving cup.

5 Claims, 8 Drawing Figures

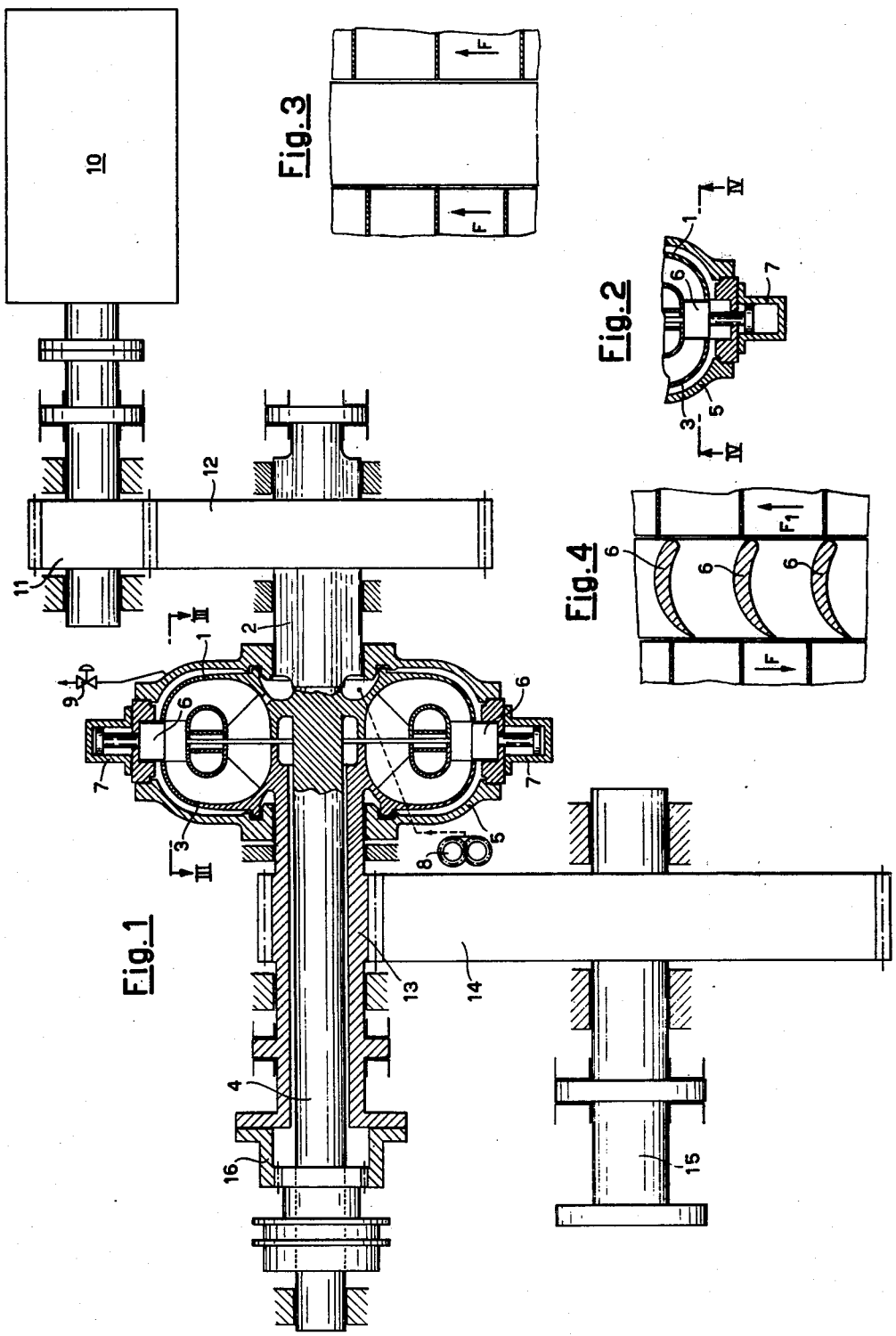

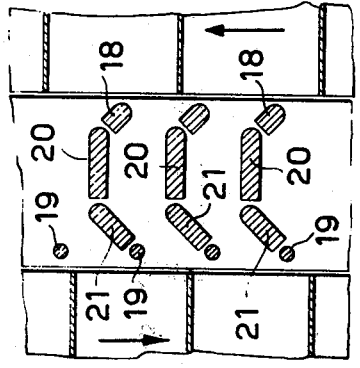
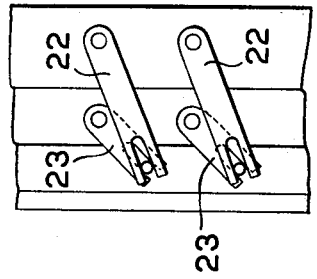
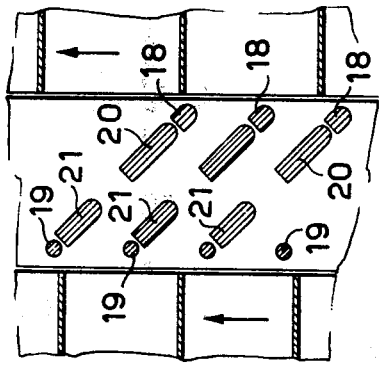
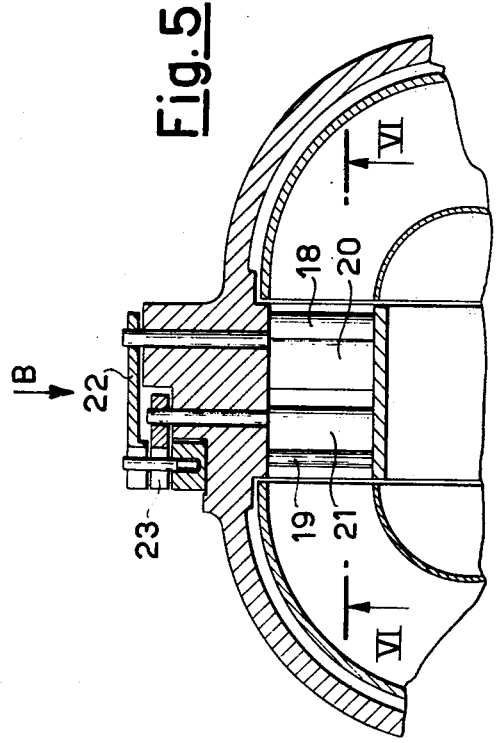

DEVICE FOR INVERTING THE DIRECTION OF ROTATION OF A DRIVEN SHAFT

The device the subject of the present invention has been envisaged in order to solve in a general manner the problem of the reversal of the motion of a driven shaft (exploitation of the power) by keeping the motion of the driving shaft both unaltered and uninterrupted.

As a nonlimiting particular case, there shall be examined herein the application to the problem of the reversal of the direction of rotation of the propeller of a ship in which the prime mover is constituted by non-reversible Diesel engines or gas turbines, and, in general by machines which cannot have their direction of rotation reversed.

The system which is commonly used for inverting the direction of rotation of a driven shaft is a mechanical system. The driving shaft can be connected to the driven shaft either directly or by the intermediary of an inversion gear train (inverter). The transition from the direct control on the inverter and therefrom takes place by means of clutching devices of various make, of the disconnectable type, such as clutches, friction clutches, hydraulic joints. This approach, which can easily be embodied if the power values involved are not exceedingly high, becomes obtrusive, bulky and inconvenient and costly when powers are involved in the order of magnitude which is common in marine engines. This approach becomes still more objectionable if the inertia of the driven shaft is considerable since, if so, the power which must be destroyed by the clutching member when the direction of motion is reversed to bring the driven shaft to the same RPM as the driving shaft, may attain such high values as to overheat the mechanical component parts and thus as to damage them.

The reversal of the direction of rotation of the propeller(s) for ships having fixed-pitch propellers is necessary for two reasons, viz.:

(a) To enable the ship to go astern even for a long time with the propellers being rotated at a speed of rotation up to 70% of the top RPM. The power delivered under such conditions attains about one third of the maximum power ahead;

(b) to permit quick stop of the ship (anti-collision run) by the braking action of the propeller which is rotated backward to 50% of its maximum RPM whereas the ship itself, due to its inertia, continues to go ahead. For the latter operation, a torque is required which is 80% of the maximum power ahead.

The problem has long since been solved in a satisfactory way for steam propelled ships by adding to the steam turbine a specially provided set of astern-run vanes.

The same problem has been solved, even though not so satisfactorily, for ships propelled by Diesel engines, by providing reversible Diesels which are capable of delivering their power in both directions of motion. Such reversibility, in fact, permits that the manoeuvers indicated under (a) above may be carried out satisfactorily but the manoeuvers indicated at (b) above can regrettably be effected only with less sastisfactory results. As a matter of fact, the engine cannot be started astern unless it has first been stopped. In the astern starting stage, the torque is produced, rather than by the engine, by the starting device of same. In addition, Diesel engines, inherently, cannot stably be rotated below the minimum RPM: these are roughly in the order of 55% of the maximum RPM.

On ships in which a very high manoeuverability is required, Diesel engines of the non-reversible type are frequently adopted, which are coupled to variable-pitch propellers.

The problem, however, appears to have been solved less satisfactorily in the case of a propelling system having gas turbines only, since the market does not tender, at present, reversible gas turbine engines, even though it is known that many manufacturers have put such a study in programme. It has been recently suggested to superimpose astern-run vanes to the conventional ahead-run vanes of the gas turbine. In such a case, by baffling the gas stream towards the former, or the latter vanes, it becomes possible to reverse the motion of the driven shaft. Such an approach, however, involves a greater intricacy in component parts which are inherently intricate and also a deterioration of the efficiency during the normal operation of forward motion, due to the losses of gas in the baffling means and the weakening of the gas steam in the additional vanes.

Consequently, up to the present time, the problem in gas turbine propulsion systems has been solved, as a rule, by adopting variable-pitch propellers, or, as an alternative, with inverting gears. The variable-pitch propellers, have the defect (as compared with the fixed-pitch propellers) of a higher first cost, a greater propeller hub diameter and a decrease of the propelling efficiency of the propellers along with the necessity of docking the ship for repair, checkout and inspection of the vane control mechanism.

As a result of such shortcomings, the examples are numerous of gas turbine propelling systems with fixed-pitch propellers and inverting gear trains, in which the turbine controls the reducing gear either directly or via an inversion gear train.

In order to effect transition from direct drive to drive with the intermediary of an inversion train, there is used either a pair of disc friction clutches or a pair of disconnectable hydraulic couplings. By so doing, if either component of the pair is inserted and the other is cleared, and vice versa, it becomes possible to invert the direction of rotation of the propeller(s). When disc friction clutches are used, it has been seen that, in the manoeuver of rapid stop from the maximum speed, difficulties arise which derive from the considerable amount of heat that the friction clutch is required to disperse. More particularly, the friction clutch, which is generally air-cooled, attains a very high temperature and the contacting surfaces wear considerably.

To this defect, there must be added the intricacy and the cost of the train of inversion gears.

If, instead of two friction clutches, two hydraulic couplings are used, by filling either coupling with oil and dumping the oil from the other, the manoeuvers can be completed. The dissipation of the heat evolved in the ship quick-stop operation is entrusted to the oil which fills the coupling.

Such a system is completed by a self-synchronizing coupling which connects the gas turbine directly to the gears of the reduction train, by bypassing the ahead run hydraulic coupling during the normal navigation, thus preventing the power loss which corresponds to the efficiency of such a coupling.

The knowledge acquired in the construction of power systems for ships of which a high manoeuverability is required, such systems comprising Diesel engines, Gas-turbine Diesels, or Steam turbines, as well as the results of tests made all over the world, have shown that the ideal prerequisites for a hydraulic device for the reversal of the direction of rotation of a propeller are as follows:

(1) Simplicity in construction, as achieved by limiting the number of the component parts;

(2) Possibility of quickly and reliably actuating the hydraulic coupling and of rapidly and surely deactivating the direct control so as to effect the quick stoppage of the ship;

(3) Ability of dispersing the heat by the coupling so as to permit that the ship concerned may be stopped without overheating the coupling and the oil contained therein;

(4) Possibility of emergency action in th case of average of the hydraulic coupling and the self-synchronizing coupling;

(5) Convenient access to the component parts of the inverter for possible repair, checkups and overhauling without being compelled to dock the ship.

A principal object of the present invention is to provide a hydraulic device for the reversal of the direction of rotation of a driven shaft, more particularly for driving fixed-pitch propellers on board ships driven by non-reversible internal combustion engines, so as to fulfil the above enumerated requirements.

Having thus object in view, the invention provides a device for transferring the rotary drive from a driving shaft to a driven shaft, of the kind in which the driving shaft carries a driving cup which pumps a liquid into a driven cup which is borne by the driven shaft, such device being characterized in that a channel between said two cups has in its interior an annular set of flow-diverting vanes which can be shifted between a first position which does not substantially disturb the liquid stream emerging from the driving cup, and a second position in which the vanes deflect said liquid stream in order substantially to invert the direction of the tangential component of the liquid stream aforesaid.

Stated another way, the invention proposes to deflect, with the intermediary of a set of vanes, the liquid stream emerging from the driving cup in such a way as to have the stream impinging onto the driven cup just in the same direction which would be experienced if no baffling vanes were present but the driving cup would be rotated in the reverse direction.

Both the structural and functional features of the invention, along with its advantages over the conventional art will become apparent from a scrutiny of the ensuing description of an exemplary embodiment thereof, as illustrated in the accompanying drawings, in which:

FIG. 1 is a cross-sectional view showing a possible embodiment of the invention as practically applied to the field of marine propulsion systems.

FIG. 2 is a closeup view showing the set of flow-diverting vanes in an working condition other than that depicted in FIG. 1.

FIGS. 3 and 4 are two cross-sectional views, taken along the lines III—III and IV—IV of FIGS. 1 and 2, respectively.

FIG. 5 is a cross-sectional view illustrating a second form of hydraulic coupling.

FIGS. 6 and 7 are two cross-sectional views, both taken along the line VI—VI of FIG. 5, and showing two respective and different working conditions of the flow-diverting vanes, and FIG. 8 is a top view taken along the direction of the arrow B of FIG. 5.

Having now reference, at the outset, to FIG. 1 of the drawings, the hydraulic coupling device of the invention is structurally composed by a driving cup 1, which is rigidly connected to a driving shaft 2, by a driven cup 3, rigidly connected to a driven shaft 4, by a casing 5, capable of withstanding the oil pressure, and by a set of reversing vanes 6, equipped with a control servomechanism, the latter consisting of a set of hydraulic jacks 7 connected to the separate vanes.

The assembly is completed by an oil pump 8 for filling the coupling and by a telecontrolled valve 9, intended to regulate the quantity of oil which must flow into the coupling so as to disperse the calories generated in and by the coupling.

By means of individual jacks 7, the set of vanes 6 can take two different positions, viz.: a first position, shown in FIGS. 1 and 3, in which the set of vanes does not disturb the flow of the oil stream between 1 and 3, so that the driven cup 3 is rotated in the same direction of rotation as the driving cup 1, as indicated by the arrows F of FIG. 3, and, a second position, in which the set of vanes, conversely, deflects the oil stream in such a way that the driven cup 3, is rotated in a direction which is the opposite of that in which the driving cup 1, is rotated, as indicated by the arrows $F_1$ and $F_2$ of FIG. 4.

By acting upon the jacks 7, it is thus possible to obtain that, while the driving shaft 2 rotates constantly in the same direction of rotation, the driven shaft 4 can be rotated in either of two opposite directions of rotation.

The heat generated during progress of the reversal manoeuver is removed by the oil which flows through the coupling. By conservatively sizing the oil pump 8 and the dump valve 9 it is possible to cope with those emergencies in which the heat buliding is exceptionally high.

A particular application has been studied for the case in which, for a marine propulsion system, there are the following requirements to fulfill:

(a) To disperse a considerable amount of heat during the reversal of the direction of motion of the ship, as due to the inertia of the driven shaft or to other reasons;

(b) directly to connect the driving shaft to the driven shaft so as directly to suppress the loss of efficiency of the hydraulic coupling during long period of time in which no reversal manoeuvers are required, and (c) rapidly to undo the direct connection between the driving shaft and the driven shaft so as to be able to effect sudden manoeuvers which might become necessary.

For such a special application, the reversal system is composed by:

a reversing hydraulic coupling of the kind described herein before;

a self-synchronizing coupling of conventional make and capable of stably connecting the driving shaft to the driven shaft;

an oil-feed system for the reversing coupling.

In the particular case of the propulsion of watercraft, it has been deemed appropriate that the hydraulic coupling is not sized to transfer the entire power from the engine (prime mover) but only the power which is required during progress of the manoeuver. By so doing, it is possible to confine both the bulk and first cost of the coupling within more reasonable boundaries, for the normal course, there will be used the self-synchronizing coupling which, capable as it is of being inserted into action at the completion of the manoeuvers without having to stop the engine, will directly connect the driving shaft to the driven shaft. Under such conditions of operation, the oil pump for filling the coupling can be stopped in order to prevent an unnecessary power usage.

It is important to note that, if the pump is kept running for special requirements (such as navigation in fog) there would not be any stream power losses in the interior of the coupling since the two cups, the driving one and the driven one, are rotated as an entity while, as is known, the power losses in hydraulic couplings are proportional to the rotation speed differential between the two cups. In FIG. 1 there is shown by way of non-limiting example of application of the kind referred to above which is particularly suitable for marine propulsion with gas turbines and more particularly for propulsion with non-reversible engines.

In such illustration, a non-reversible engine 10 controls through a double-reduction reducing gear train (couples of gears 11, 12 and 13, 14) a driven shaft 15, which in the case of marine propulsion, is the shaft of a fixed-pitch propeller.

On the shaft of the gear 12 there is arranged the reversal hydraulic coupling described above, the driving cup 1 of which is rigidly connected to the gear 12, whereas the driven cup 3 is rigidly connected to the gear 13. The driving cup 1 can thus be directly connected to the gear 13 by means of a self-synchronizing coupling 16 and, if so, the driving cup 1, the gear 13 and the driven cup 3 are rotated in unison.

FIGS. from 5 to 8 of the drawings shown another possible embodiment of a set of vanes for inversion as applied to the hydraulic coupling of this invention.

In this embodiment, the vanes are constantly inserted in the channel existing between the driving cup and the driven cup, but each vane comprises a couple of fixed end sections 18, 19 and a couple of swingable central sections 20, 21. When the sections 18, 19, 20 and 21 are in alignment, as shown in FIG. 6, the oil stream between 1 and 3 is not substantially deflected and thus the driven cup 3 is rotated in the same direction of rotation as the driving cup 1 (FIG. 6). When, conversely, the central vane sections 20 and 21 are shifted to the position of FIG. 7, the set of vanes deflects the oil stream in such a way that the driven cup 3 is rotated in a direction which is the contrary of the direction of cup 1.

The switching of the sections 20 and 21 can be achieved, for example by the agency of linkages 22 and 23.

It is apparent that the same result could also be achieved with a different number, or with a different arrangement, of the movable and the fixed sections.

While there have been disclosed and illustrated by way of example two possible embodiments of the invention, it will be understood that modification and changes can be introduced therein without departing from the scope of the invention. Thus, the invention can be applied also to fields other than that of marine propulsion and more precisely in all those cases in which a sudden inversion of the direction of motion is necessary for a shaft which is driven by a non-reversible prime mover.

The scope of this invention is defined in and by the appended claims.

We claim:

1. A hydraulic coupling device for transferring rotational drive from a driving shaft to a driven shaft, the device comprising a driving cup and a driven cup, vane means associated with the respective cups to establish fluid flow between the cups and rotation of the driven cup responsive to rotation of the driving cup, casing means defining an annular chamber between said cups in fluid flow communication with the vane means of the respective cups, a set of flow-diverting vanes associated with said casing means, said vanes having first positions relative to said channel establishing a first direction of rotation of the driven cup relative to the driving cup and second positions relative to said channel establishing a reverse direction of rotation of the driven cup relative to the driving cup and separate actuators for each of said vanes for moving the vanes between said first and second positions.

2. The device as claimed in claim 1 wherein said vanes in said first positions are located externally of said channel and in said second positions are located internally of said channel.

3. The device as claimed in claim 2 wherein said vanes are movable radially into an out of said channel.

4. The device as claimed in claim 3 wherein said separate actuators comprise hydraulic jacks associated with the respective vanes for individually moving each vane radially into and out of said channel.

5. The device as claimed in claim 4 wherein said vanes are located within said channel and are pivotally movable between said first and second positions.

* * * * *